United States Patent [19]

Knappe

[11] Patent Number: 5,565,721

[45] Date of Patent: Oct. 15, 1996

[54] ELECTROMOTIVE DRIVE

[75] Inventor: Wolfram Knappe, Kitzingen, Germany

[73] Assignee: Siemens Aktiengesellschaft, München, Germany

[21] Appl. No.: 163,229

[22] Filed: Dec. 7, 1993

[30] Foreign Application Priority Data

Dec. 8, 1992 [EP] European Pat. Off. .............. 92120906

[51] Int. Cl.$^6$ ........................... H02K 11/00; H02K 21/12
[52] U.S. Cl. ........................................ 310/68 B; 310/156
[58] Field of Search ................................ 310/42, 43, 44, 310/45, 68 B, 218, 261, 156; 324/200, 207.11; 335/302, 306

[56] References Cited

U.S. PATENT DOCUMENTS

| | | | |
|---|---|---|---|
| 2,736,827 | 2/1956 | Buchmann | 310/156 |
| 3,246,187 | 4/1966 | Iemura | 310/156 |
| 3,953,752 | 4/1976 | Bannon | 310/156 |
| 4,206,379 | 6/1980 | Onda | 310/156 |
| 4,321,495 | 3/1982 | Kennedy | 310/156 |
| 4,385,249 | 5/1983 | Fukushima | 310/68 R |
| 4,641,422 | 2/1987 | Weaver | 310/156 |
| 5,097,162 | 3/1992 | Wang | 310/156 |

FOREIGN PATENT DOCUMENTS

| | | |
|---|---|---|
| A10489940 | 12/1990 | European Pat. Off. . |
| 0547767A1 | 11/1992 | European Pat. Off. . |
| 994928 | 11/1951 | France . |
| 687716 | 2/1940 | Germany ................................ 310/156 |
| 2823683 | 12/1979 | Germany ................................ 310/156 |
| U19006935.8 | 6/1990 | Germany . |
| 53-86405 | 7/1978 | Japan ................................. 310/156 |
| 54-13910 | 2/1979 | Japan ................................. 310/156 |
| 54-147410 | 11/1979 | Japan ................................. 310/156 |
| 55-60579 | 12/1981 | Japan ................................. 310/156 |
| 58-095967 | 6/1983 | Japan . |
| 63-040813 | 8/1986 | Japan . |
| 63-225123 | 3/1987 | Japan . |
| 4183245 | 11/1990 | Japan . |
| 630504G | 7/1979 | Switzerland . |

Primary Examiner—Clayton E. LaBalle
Attorney, Agent, or Firm—Kenyon & Kenyon

[57] ABSTRACT

A holder for mounting a magnet wheel which consists of a brittle magnet body, in a simple manner, firmly onto the rotor shaft of an electromotive drive. The magnet body is placed, with a sliding seat, and in a merely self-centering manner, onto the rotor shaft and is then axially and tangentially fixed in position on the rotor shaft with a holding part. The holding part is arranged in front of the magnet body and is pushed, with a force fit, onto the motor shaft. The holding part is connected, in form-locked manner, with the magnet body.

12 Claims, 4 Drawing Sheets

ELECTROMOTIVE DRIVE

BACKGROUND OF THE INVENTION

The present invention relates to an electromotive drive having a magnet body held on its rotor shaft. Such drives are suitable, in particular, as an auxiliary drive in a motor vehicle in which the magnet body is a magnet wheel attached to the rotor shaft and producing a speed-proportional signal in a stator-side Hall probe device. Such drives may be employed, for instance, in speed-controlled window drives or window drives controlled by the direction of rotation.

European Patent Application No. EP-A1-0 489 940 describes a commutator motor in which Hall probes are arranged on a stator-side electronics connection plate for the speed-control. A magnet wheel is attached directly to the rotor shaft and is associated with the Hall probes. The magnet wheel can be attached on the rotor shaft, by a corresponding force fit and/or adhesive fit.

Japanese Patent Application No. JP4-A-1 83 245 describes an arrangement for mounting a magnet body on a rotor shaft. A separate holding part has axial protrusions which engage corresponding recesses in one end side of the magnet body which faces the holding part. The other end side of the magnet body rests against an engine-side stop in the form of the laminated rotor core.

U.S. Pat. No. 2,161,953 describes a mounting arrangement of a magnet body on a rotor shaft. A separate holding part has an axial driving arm which engages as corresponding recess in one end side of the magnet body. The other end side of the magnet body rests against an engine side stop in the form a ring fixed in position on the rotor shaft.

German Patent Application No. DE-U1-90 06 935 describes an electromotive drive for a motor vehicle. The electromotive drive has a commutator and a magnet wheel arranged on the rotor shaft to detect the speed and/or direction of rotation. This arrangement cooperates with a stator-side Hall sensor. A spacer bushing is placed, fixed for rotation, on the rotor shaft for holding the magnet wheel on the rotor shaft. The magnet wheel is then either forced, placed, or cemented concentrical to the spacer bushing onto the outer circumference of the latter or is attached by means of force locking. For the force-locked attachment, the spacer bushing is provided with a flattening on its outer circumference and the magnet wheel is provided with a matching flattening on its corresponding inner side. To axially fix the spacer brushing in position, the spacer bushing rests with its one end side against the commutator and it is fixed in position at its other end side with a retaining ring. The retaining ring can be inserted into the rotor shaft in form-locked manner. The magnetic wheel can consist of a plastic body with magnet particles incorporated in the plastic or of a non-magnetic basic body into which permanent magnets are inserted.

Unfortunately, the magnet body is relatively brittle. Therefore tangentially and axially fixing the magnet body into position on the rotor shaft with a force fit such that the magnet body will reliably remain on the rotor shaft even after long and rough operation tends to crack the brittle magnet body. Fixing the magnet body into position on the rotor shaft with adhesive is not sufficiently reliable. Hence, the arrangement described in European Patent Application No. EP-A1-0 489 940 is not acceptable.

Further, the arrangement described in Japanese Patent Application No. JP-A-1 83 245 and U.S. Pat. No. 2,161,953 have a large installation size and/or are not particularly simple. In addition, these arrangements do not permit the axial position of the magnet body to be adjusted.

Thus, there exists a need to provide a relatively simple arrangement to tangentially and axially fix a brittle magnet body on a shaft such that the magnet body will remain on the shaft even after long and rough operation, without exerting forces on the magnet body which could lead to cracking, such that the axial position of the magnet body can be adjusted, and with a small installation size.

SUMMARY OF THE INVENTION

The present invention fulfills the above need by providing an electromotive drive having a magnet body and a holding part. The magnetic body has a shaft opening corresponding to, and slightly larger than, the outer surface of a rotor shaft of the magnetic drive. As a result, when the magnet body is placed on the rotor shaft in a centering manner, pressure and tensile stresses do not result. The holding part contacts the magnet body in form-locked and tangential connection and is arranged axially adjacent to the magnet body. The holding part is pushed into an axially and tangentially faced position on the rotor shaft, and as a result, axially and tangentially secures the magnet body on the rotor shaft.

With the electromotive drive of the present invention, axially and tangentially fixing the magnet body in position on the rotor shaft is possible without regard to the brittleness of the magnet body. This fixing is accomplished with a holding part. Thus, additional cementing is not required. The holding part can be designed in rugged manner with a view toward a sufficient force fit. The holding part can be further designed to have the magnet body center itself by using a sliding-seat mounting relative to the rotor shaft on the rotor shaft independently of the holding part. Due to the mounting of the holding body axially in front of or behind the magnet body, attaching the magnet body without radially increasing the structural size of the arrangement is possible. Further, such an arrangement is axially compact.

In one embodiment of the present invention, the magnet body is combined with the holding part in one pre-assembled structural unit such that the structural unit need be placed onto the rotor shaft in only one manipulation thereby advantageously facilitating automatic assembly.

DETAILED DESCRIPTION

Figure 1:
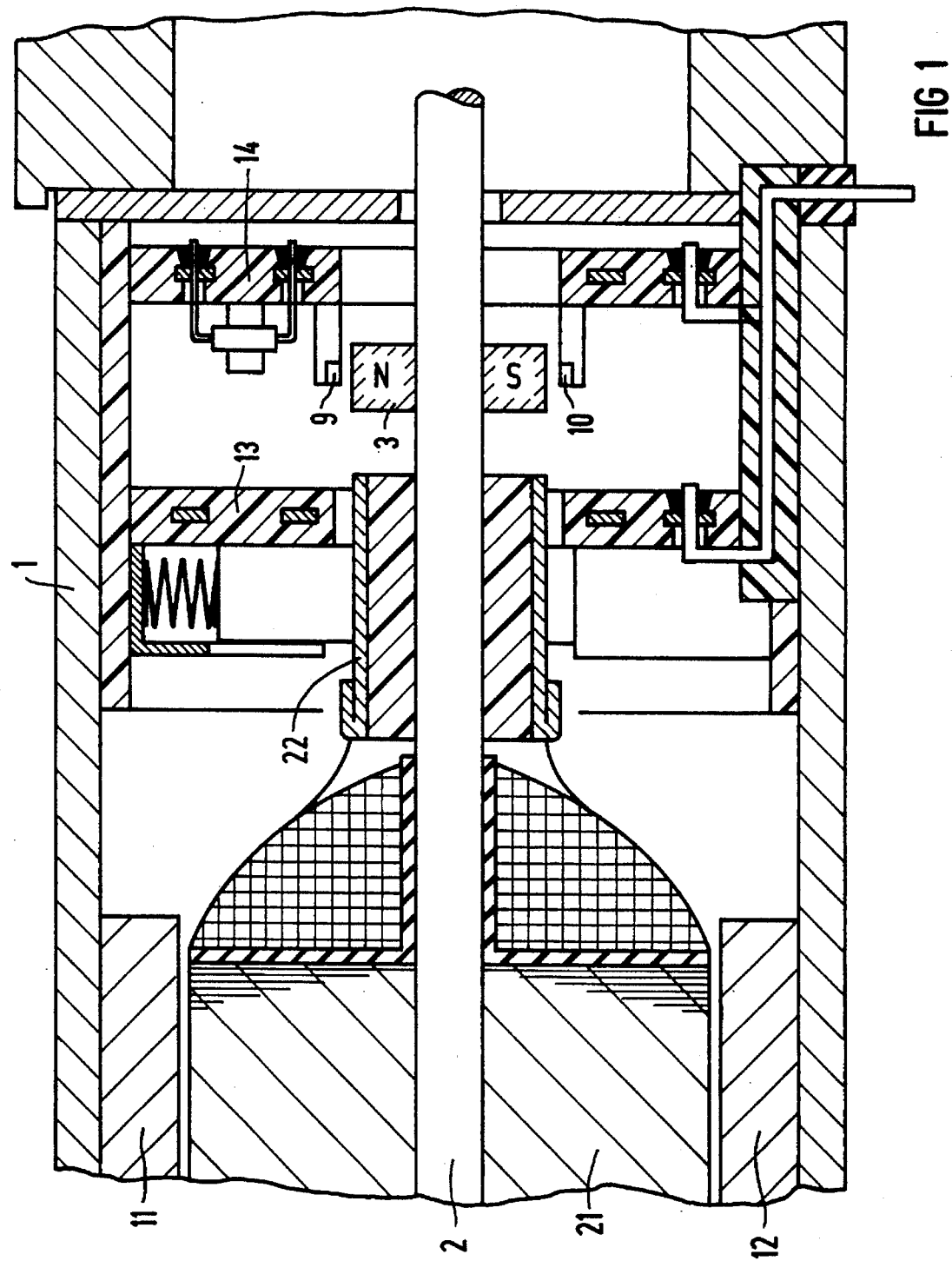
FIG. 1 is an axial side partial cross-sectional view of a commutator motor with a magnet body in the form of a magnet wheel which is attached in known manner directly to a rotor shaft.

FIG. 1 is partial cross-sectional axial side view illustrating a commutator motor with permanent magnets 11, 12 provided on the inner circumferential surface of a motor housing 1 for excitation. A rotor lamination core 21 is attached to a rotor shaft 2 and provided with a rotor winding as well as a commutator 22. The commutator is arranged axially in front of the laminated core 21 and is contacted by carbon brushes held on a brush support plate 13. A magnet wheel NS having a correspondingly polarized permanent magnet body 3 consisting of a plastic-encapsulated ferrite magnet ring 3 is attached directly to the rotor shaft 2. The direction and/or speed of rotation of the magnet wheel body 3, and hence the rotor shaft 2, is detected with Hall probes 9, 10. The Hall probes 9, 10 are cemented on a printed circuit board 14 facing the stator. The Hall probes 9, 10 are associated with the permanent magnet body 3.

Unfortunately, as described above, the cemented connection of the magnet body to the rotor shaft cannot, in all cases, assure a sufficiently reliable firm seat on the rotor shaft. This is particularly true during rough operation and after long operating times. A force firing of the magnet body, on the rotor shaft which would better withstand such stresses, is not possible due to the brittleness of the magnetic body which, upon excessive pressure or tensile stresses, and in particular in case of corresponding tolerances of the components to be assembled, can lead to cracks in the magnet body and thus to a loosening of the force fit.

The above-mentioned disadvantages are simply corrected with an arrangement having an advantageously small structural size in accordance with the present invention. The magnet body proper is not subject to any force-fit pressure on the rotor shaft 2 since a holding part axially and tangentially lutes the magnet part 3 into position on the rotor shaft 2. The holding part is mounted axially in front of, and/or behind, the magnet body 3. However, the magnet body 3 can still be centered (i.e., be axially positioned) on the rotor shaft 2 and thus assume its optimal distance from the stator-side Hall probes.

Figure 2:
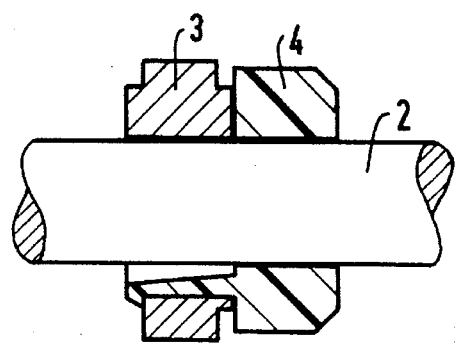
FIG. 2 is an axial side partial cross-section from FIG. 1 along the section line II—II of FIG. 3 with illustrates, in detail, a first arrangement of the present invention for mounting a magnet body in which a plastic bushing has been forced onto the rotor shaft.
Figure 3:
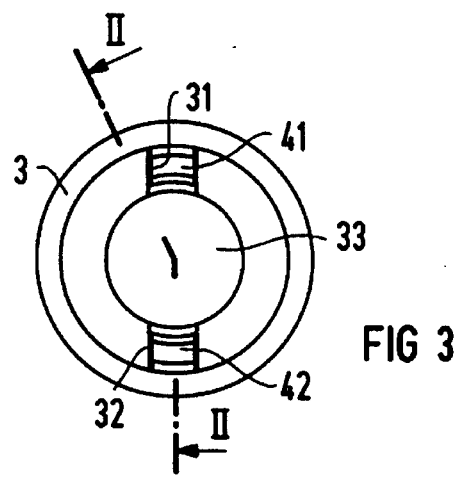
FIG. 3 is a front end axial view of the arrangement according to FIG. 2.
Figure 4:
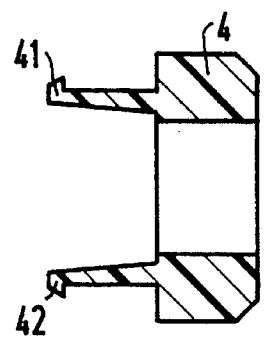
FIG. 4 is a longitudinal cross-section through the plastic bushing of FIG. 2.
Figure 5:
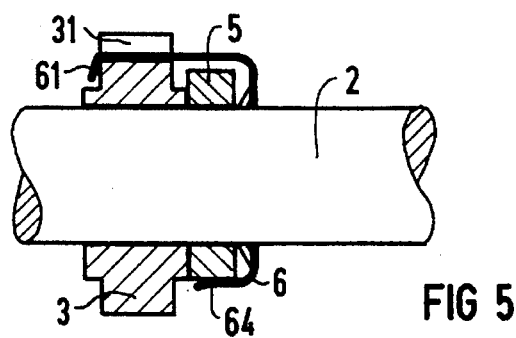
FIG. 5 is an axial side partial cross-section of FIG. 1 along the section line V—V of FIG. 6 which illustrates, in detail, a second arrangement of the present invention for mounting a magnet body in which a metal disk has been forced onto the rotor shaft and in which a spring clip tangentially and axially secures in position the permanent magnet body against the metal disk.
Figure 6:
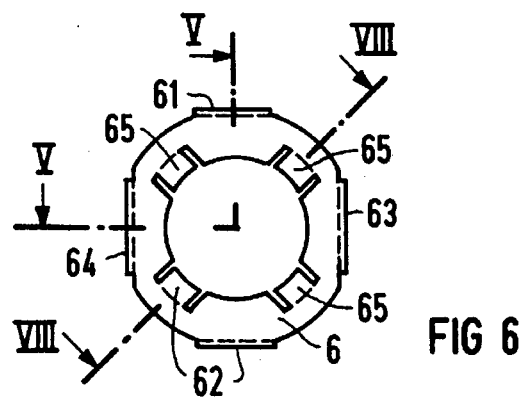
FIG. 6 is a front end axial view of the spring clip according to FIG. 5.
Figure 7:
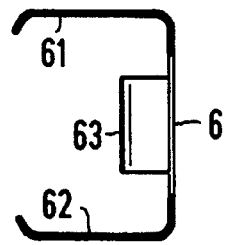
FIG. 7 is an side axial view of the spring clip according to FIG. 6.
Figure 8:
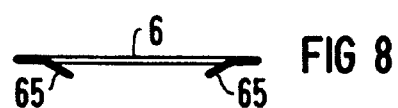
FIG. 8 is a top view of section through the spring clip along the section line VIII—VIII of FIG. 6.

FIGS. 2 to 4 illustrate a first embodiment of a device for axially and tangentially fixing the permanent magnet body 3 in position on a rotor shaft 2 in accordance with the present invention. A plastic bushing 4 is pressed on the right end side of the magnet body 3 which has been placed on the rotor shaft 2 merely with a sliding seat (i.e., the inner diameter of the magnet body 3 is slightly larger than the outer diameter of the rotor shaft 2) and thus in self-centering manner. As shown in FIGS. 3 and 4, the plastic bushing 4 is pushed such that axially protruding snap hooks 41, 42 extend through corresponding grooves 31, 32 of the magnet body 3 and engage the left end side of the magnet body 3. As illustrated, in particular in FIG. 4, the plastic bushing 4 with the snap hooks 41, 42 is advantageously developed as integral plastic injection molded part.

Figure 9:
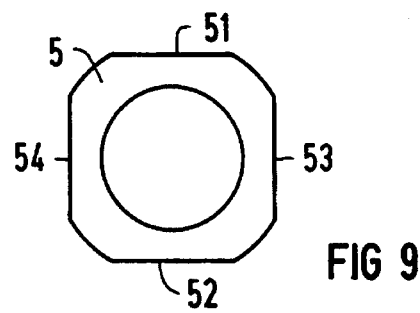
FIG. 9 is a front end axial view of the metal disk according to FIG. 5.
Figure 10:
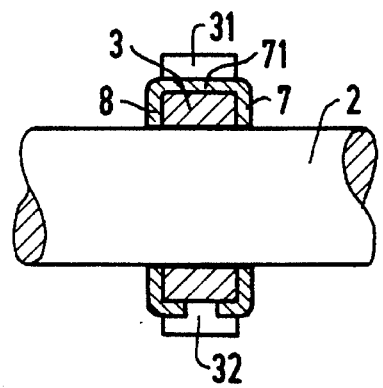
FIG. 10 is an axial side partial cross-section of FIG. 1 which illustrates, in detail, a third arrangement of the present invention for mounting a magnet body in which retaining clips on both sides of the magnet body are forced onto the shaft and connected by a connecting web.
Figure 11:
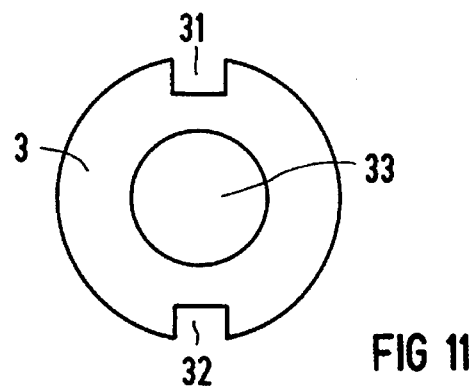
FIG. 11 is an front end axial view of the magnet body according to FIG. 10.

An alternate embodiment of the device of the present invention is illustrated in FIGS. 5 to 9. The holding part 5, 6 consists of a more heat-resistant metal disk 5 and a spring clip 6. The metal disk 5, in particular a brass disk, rests directly or indirectly against a first end side (i.e., the right side) of the magnet body 3. The spring clip 6 is arranged in front of the metal disk 5 and has axially protruding holding arms 61, 62. The holding arms 61, 62 extend through corresponding grooves 31, 32 formed in the magnet body 3 and rest against the second end side (i.e., the left side) of the magnet body 3. In this embodiment of the present invention, the magnet body 3 is again placed on the rotor shaft 2 merely with a centering sliding seat while the metal disk 5 is placed on the rotor shaft 2 with a force fit. The spring clip 6, which has been placed, preferably without force fit, onto the rotor shaft 2, is in force-locked driving engagement, via axially protruding driving arms 63, 64, with the metal disk 5 which is firmly seated on the rotor shaft 2. As shown in FIG. 9, to engage the driving arms 63, 64, the metal disk 5 has flattened surfaces 53, 54 on its outer circumference which correspond to the flat driving arms 63, 64. Between the flattened surfaces 53, 54, similar flattened surfaces 51, 52 are located against which the similarly flat holding arms 61, 62, which extend over the magnet body 3, rest.

To provide an advantageous tolerance compensation, the spring clip 6 furthermore has, distributed over its circumference, axially protruding spring lugs 65. With the spring lugs 65, the spring clip 6 supports itself, in resilient manner, on the end side of the metal disk 5 not contacting the magnet body 3. The spring lugs 65 force the metal disk 5 against the magnet body 3 which in turn forces the magnet body 3 against the holding arms 61, 62 of the spring clip.

Yet another embodiment of the present invention is illustrated in FIGS. 10–13. The holding part 7 and 8 includes a first retaining clip 7 and a second retaining clip 8, which rest against the two end sides of the magnet body 3. The first and second retaining clips 7, 8 are connected by a connecting web 71. The connecting web 71 preferably engages a corresponding groove 31 formed in the magnet body 3. As clearly shown in FIG. 10 and FIG. 12, the free ends of the first and second retaining clips 7 and 8 opposite the connecting web 71 are provided with axial driving webs 72, 82. The driving webs 72, 82 preferably also engage a corresponding groove 32 formed in the magnet body 3. Rotor shaft openings 73, 83 are defined in the first and second annular holding parts 7, 8. The rotor shaft openings 73, 83 are dimensioned such that the holding part 78 is provided with a force-fit mounting on the rotor shaft 2. The rotor shaft openings 73, 83 of the holding part 78 are dimensioned to be smaller than the rotor shaft opening 33 of the magnet body 3.

Figure 12:
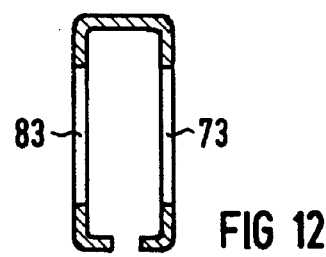
FIG. 12 is a axial side cross-sectional view of the retaining clip connected by the connecting web in its final shape according to FIG. 10.
Figure 13:
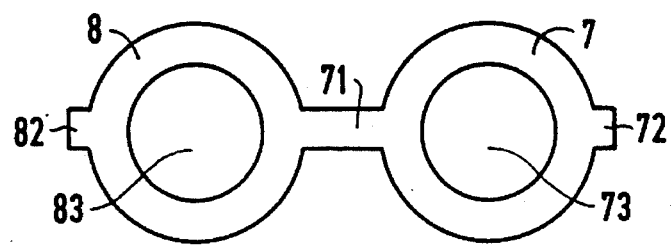
FIG. 13 illustrates the retaining clip of FIG. 12 as prefabricated part in the form of a developed stamped/bent part.

The first and second side annular holding parts 7, 8 can either be bent forward according to FIG. 12 and then be radially placed over the magnet body 3 with the resilient opening of the free ends or they can be bent according to FIG. 13 over the magnet body 3 after suitable manufacture as flat stamped/bent part. In the latter case, the permanent magnet body 3 and the holding part 78 are thus combined in simple manner to form a preassembled component unit which can be placed on the rotor shaft 2 in just one assembly manipulation, the permanent magnet body 3 centering itself with its correspondingly provided rotor shaft opening 33 in a sliding seat on the rotor shaft 2 and being placed onto the rotor shaft with force fitting via the holding part 78 with the rotor shaft opening 73 or 83.

Similar to the holding part 78 the permanent magnet body 3 and the plastic bushing 4 with the snap hooks 41, 42 formed thereon, and the metal disk 5 with the spring clip 6 resting against it in form-locked manner, can also in the case of the embodiments illustrated in FIGS. 2 to 4 and FIGS. 5 to 9, respectively, be combined with the permanent magnet body 3 as preassembled component units and then be placed on the rotor shaft 2 in one piece.

What is claimed is:

1. In an electromotive drive having a rotor shaft with an outer surface, an assembly comprising:
   a) a magnet body, the magnetic body having a shaft opening corresponding to, and slightly larger than the outer surface of the rotor shaft, whereby when the magnet body is placed on the rotor shaft in a centering manner, pressure and tensile stresses do not result; and
   b) a holding part, the holding part in form-locked and tangential contact connection with the magnet body, arranged axially adjacent to the magnet body, and pushed into an axially and tangentially fixed position on the rotor shaft thereby axially and tangentially securing the magnet body on the rotor shaft,
   wherein the magnet body includes a first end side and a second end side and has grooves formed therein, and
   wherein the holding part includes a bushing, the bushing
      i) being mechanically coupled with the first end side of the magnet body, and
      ii) having axially protruding holding arms, which extend through the grooves of the magnet body and rest against the second end side of the magnet body.

2. The assembly of claim 1 wherein the axially protruding holding arms of the bushing are snap hooks.

3. The assembly of claim 1 wherein the bushing of the holding part is a plastic bushing.

4. The assembly of claim 3 wherein the holding arms are integral components of the plastic bushing.

5. In an electromotive drive having a rotor shaft with an outer surface, an assembly comprising:
   a) a magnet body, the magnetic body having a shaft opening corresponding to, and slightly larger than, the outer surface of the rotor shaft, whereby when the magnet body is placed on the rotor shaft in a centering manner, pressure and tensile stresses do not result; and
   b) a holding part, the holding part in form-locked and tangential contact connection with the magnet body, arranged axially adjacent to the magnet body, and pushed into an axially and tangentially fixed position on the rotor shaft thereby axially and tangentially securing the magnet body on the rotor shaft,
   wherein the magnet body includes a first end side and a second end side and has a groove formed therein, and
   wherein the holding part includes
      i) a metal disk, the metal disk being mechanically coupled with the first end side of the magnet body, and
      ii) a spring clip, the spring clip
         being mounted axially adjacent to the metal disk, and
         having axially protruding holding arms which extend through the groves of the magnet body and rest against the second end side of the magnet body.

6. The assembly of claim 5 wherein the metal disk is a brass disk.

7. The assembly of claim 5 wherein the spring clip includes an inner surface dimensioned such that it can be placed on the rotor shaft free of force fit and wherein the spring clip is in form-locked rotating engagement with the metal disk via the axially protruding driving arms.

8. In an electromotive drive having a rotor shaft with an outer surface, an assembly comprising:
   a) a magnet body, the magnetic body having a shaft opening corresponding to, and slightly larger than, the outer surface of the rotor shaft, whereby when the magnet body is placed on the rotor shaft in a centering manner, pressure and tensile stresses do not result; and
   b) a holding part, the holding part in form-locked and tangential contact connection with the magnet body, arranged axially adjacent to the magnet body, and pushed into an axially and tangentially fixed position on the rotor shaft thereby axially and tangentially securing the magnet body on the rotor shaft,
   wherein the magnet body includes a first end side and a second end side and has a groove formed therein, and
   wherein the holding part includes
      i) a first retaining clip resting against the first end side of the magnet body,
      ii) a second retaining clip resting against the second end side of the magnet body, and
      iii) a connecting web connecting the first retaining clip with a second retaining clip and engaging the grove of the magnet body, and
   wherein the magnet body includes a further groove, and wherein ends of the first and second retaining clips opposite the connecting web are each provided with axial driving webs which engage into the further groove of the magnet body.

9. The assembly of claim 8 wherein the first and second retaining clips, the connecting web, and the axial driving webs are parts of an integral stamped and bent part placed on the magnet body as preformed snap part.

10. The assembly of claim 9 wherein the first and second retaining clips, the connecting web, and the axial driving webs are parts of an integral stamped and bent part bent over the magnet body.

11. In an electromotive drive having a rotor shaft with an outer surface, an assembly comprising:
    a) a magnet body, the magnetic body having a shaft opening corresponding to, and slightly larger than, the outer surface of the rotor shaft, whereby when the magnet body is placed on the rotor shaft in a centering manner, pressure and tensile stresses do not result; and
    b) a holding part, the holding part in form-locked and tangential contact connection with the magnet body, arranged axially adjacent to the magnet body, and pushed into an axially and tangentially fixed position on the rotor shaft thereby axially and tangentially securing the magnet body on the rotor shaft,
    wherein the magnet body includes a first end side and a second end side and has a groove formed therein, and
    wherein the holding part includes i) a first retaining clip resting against the first end side of the magnet body, ii) a second retaining clip resting against the second end side of the magnet body, and iii) a connecting web connecting the first retaining clip with a second retaining clip and engaging the grove of the magnet body, and wherein the first and second retaining clips and the connecting web are parts of an integral stamped and bent part placed on the magnet body as a preformed snap part.

12. The assembly of claim 11 wherein the first and second retaining clips and the connecting web are parts of an integral stamped and bent part bent over the magnet body.

* * * * *